(12) United States Patent
Hendricks, Sr.

(10) Patent No.: US 7,943,201 B2
(45) Date of Patent: May 17, 2011

(54) ROBOTIC TIRE SPRAYING SYSTEM

(76) Inventor: Todd E. Hendricks, Sr., Alvordton, OH (US)

( * ) Notice: Subject to any disclaimer, the term of this patent is extended or adjusted under 35 U.S.C. 154(b) by 810 days.

(21) Appl. No.: 11/849,496

(22) Filed: Sep. 4, 2007

(65) Prior Publication Data

US 2009/0061099 A1   Mar. 5, 2009

(51) Int. Cl.
*B05D 1/02* (2006.01)
(52) U.S. Cl. .................. 427/421.1; 118/316; 118/320; 118/713; 156/110.1; 427/424; 427/425
(58) Field of Classification Search .......... 427/8, 421.1, 427/233, 236, 427.2, 427.3; 264/315, 40.2, 264/40.7, 326
See application file for complete search history.

(56) References Cited

U.S. PATENT DOCUMENTS

| | | | |
|---|---|---|---|
| 3,507,247 A | 4/1970 | Kwierant | |
| 4,125,639 A | 11/1978 | Brandl | |
| 4,778,060 A * | 10/1988 | Wessner, Jr. | 209/3.3 |
| 5,188,904 A | 2/1993 | Graves | |
| 5,268,580 A * | 12/1993 | He | 235/462.1 |
| 5,429,682 A * | 7/1995 | Harlow et al. | 118/681 |
| 5,631,028 A | 5/1997 | Mizokawa et al. | |
| 6,077,469 A | 6/2000 | Golightly et al. | |
| 2004/0023612 A1 * | 2/2004 | Kriesel | 452/157 |

FOREIGN PATENT DOCUMENTS

| | | | |
|---|---|---|---|
| JP | 11129343 | * | 10/1999 |
| KR | 1020040018978 | * | 3/2004 |

* cited by examiner

*Primary Examiner* — Michael Kornakov
*Assistant Examiner* — Alexander Weddle
(74) *Attorney, Agent, or Firm* — Fraser Clemens Martin & Miller LLC; William J. Clemens

(57) ABSTRACT

A robotic spray system is provided for accurately spraying mold release onto any size or shaped green tire. The system analyzes individual green tires using an integrated vision system. The system controls the robotic spray position, the fan, fluid, atomizing air, and tire rotation speed for optimal spray coverage on both the inside and outside of green tires. The system includes a conveyor, an overhead mounted camera located over an infeed station, and a second camera located perpendicular to the green tire's tread and several feet away from the center of the tire. Pictures of the green tire in the station are used to estimate the center and radius of the tire and locate the angle of the bar code with respect to the center of the tire. Reference points are provided from the camera images and robot positions are calculated to control the spraying.

18 Claims, 11 Drawing Sheets

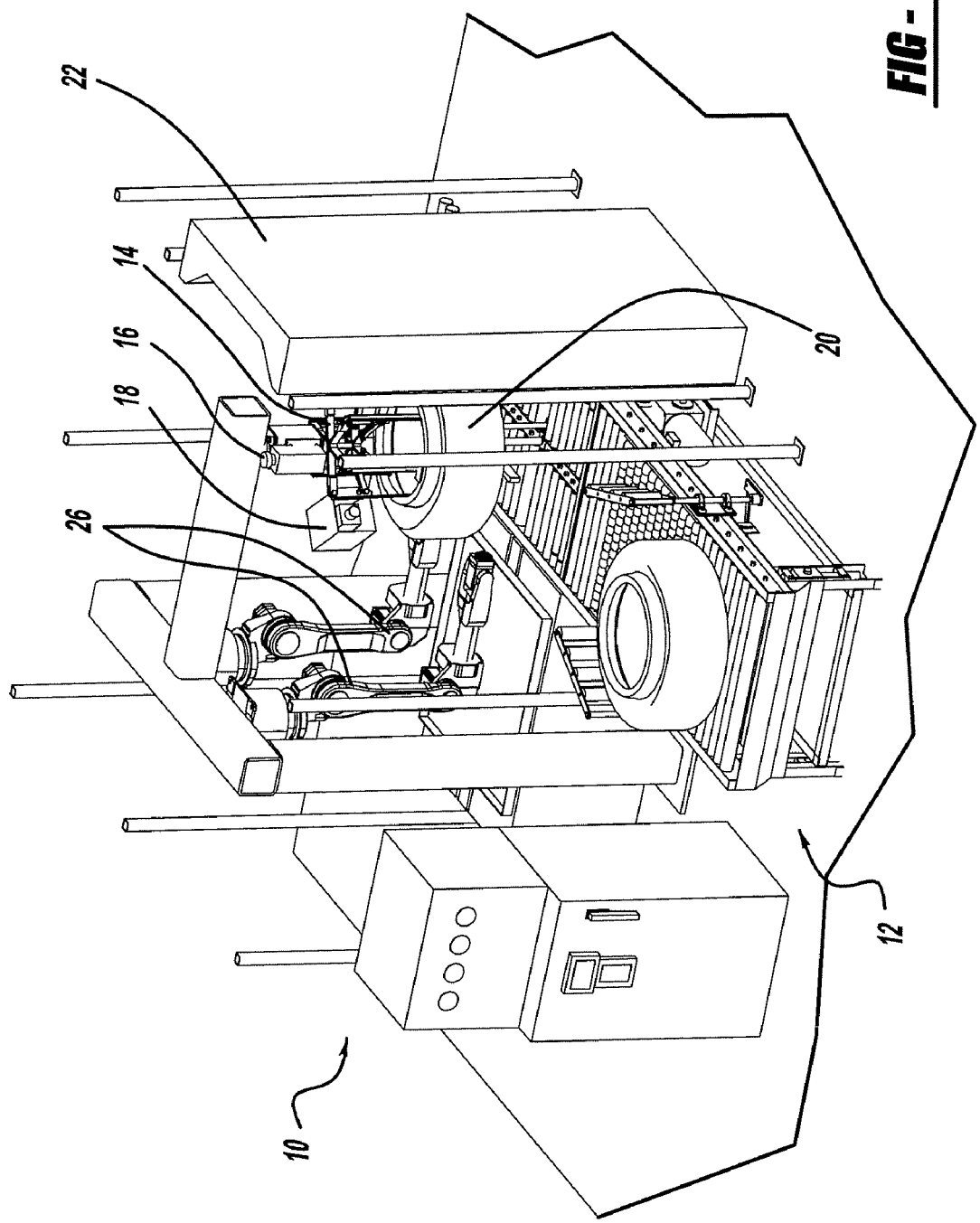

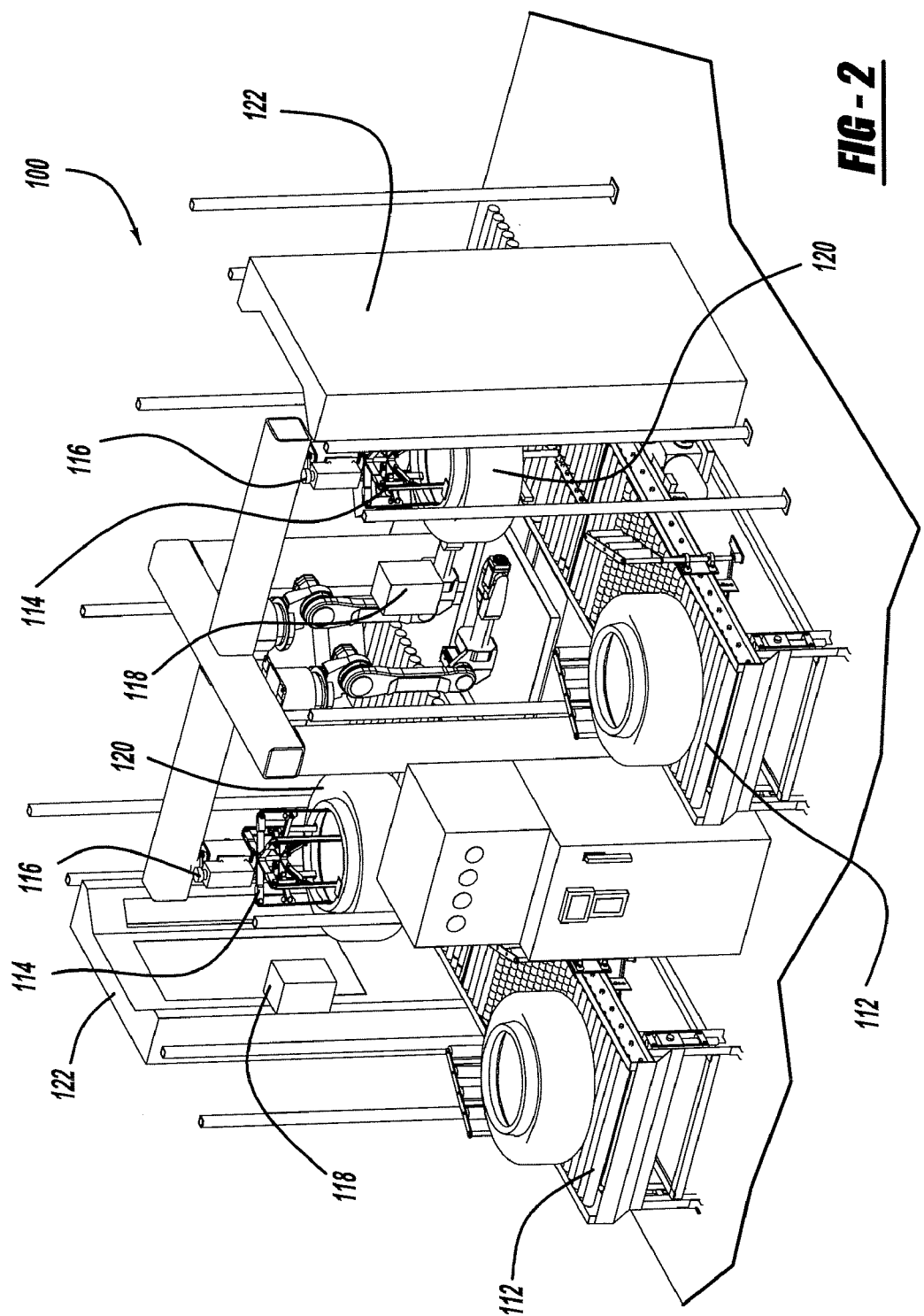

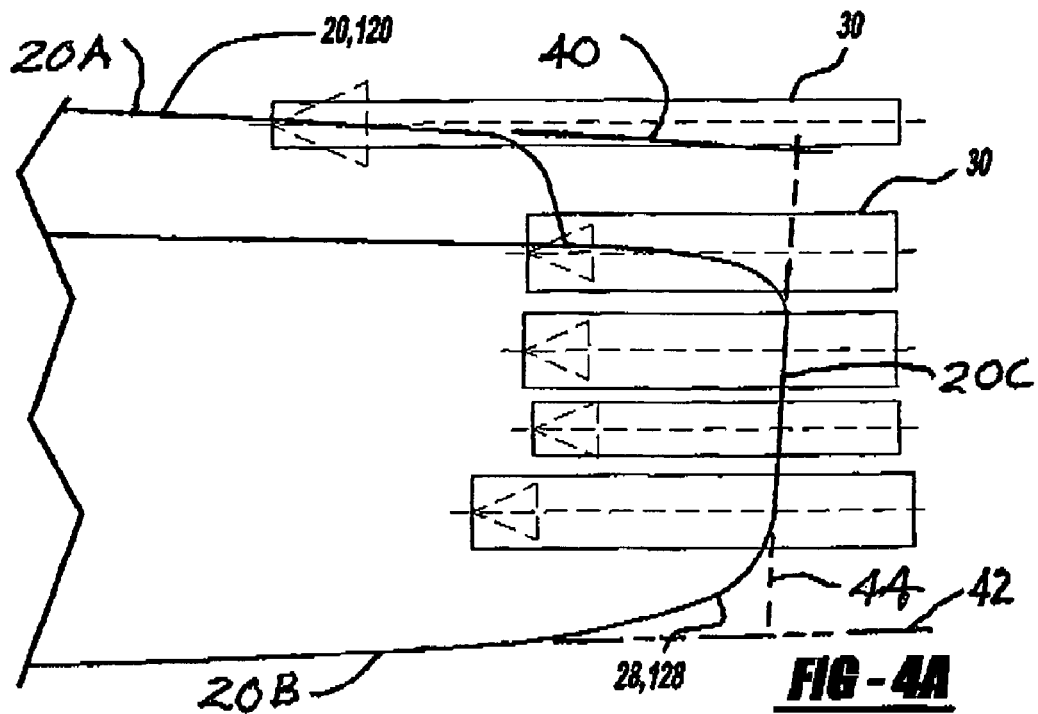
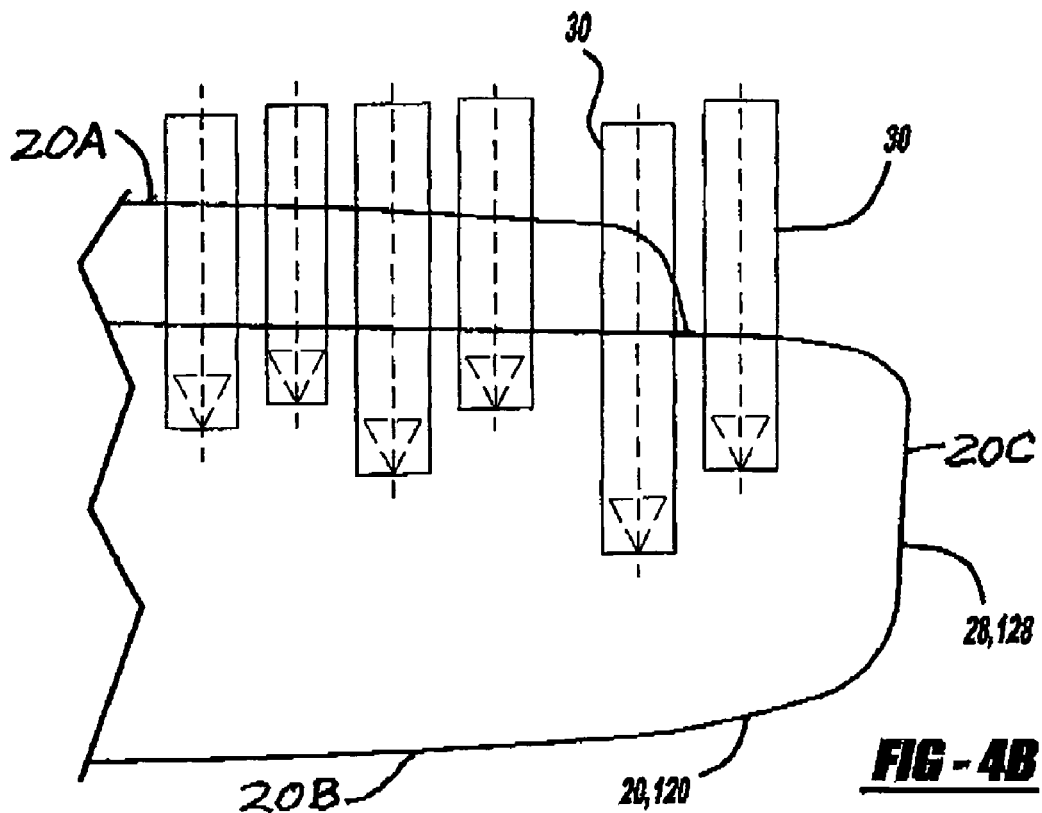

Tire 1

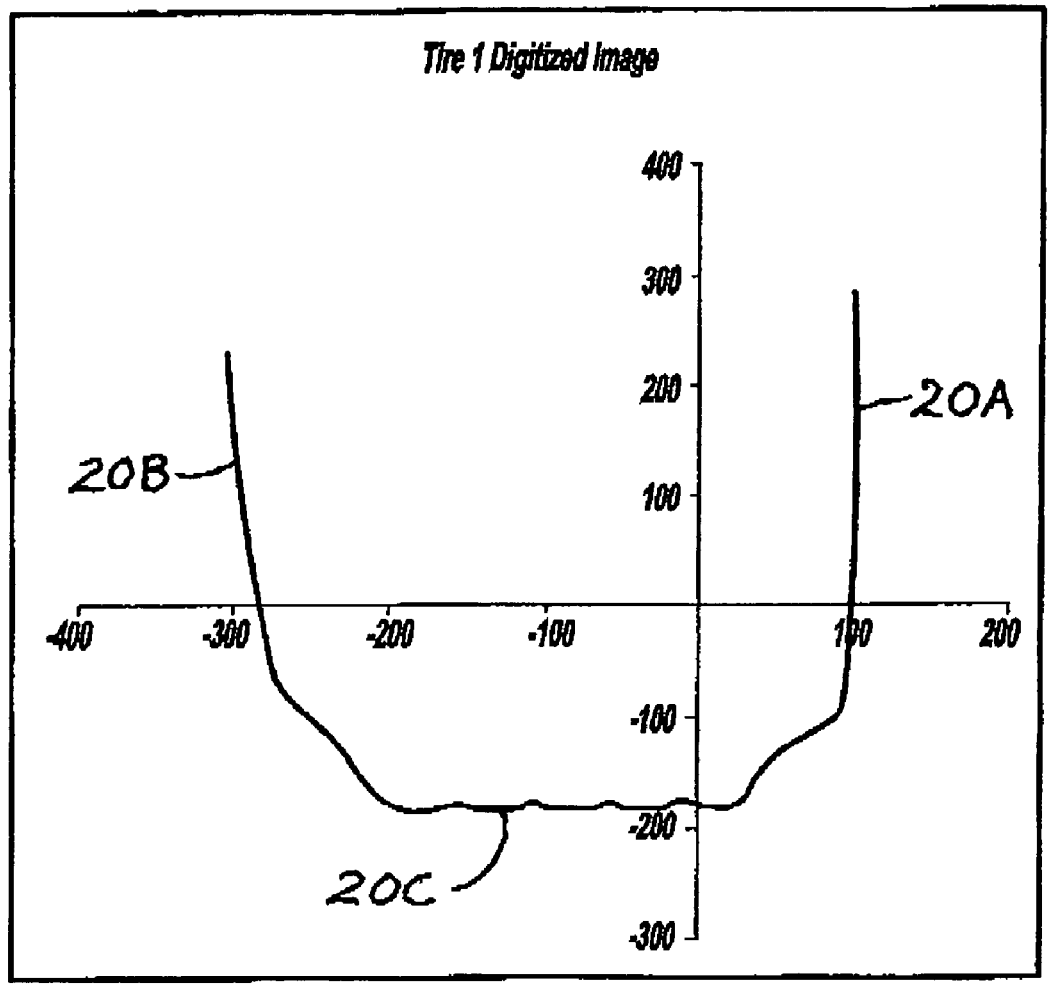
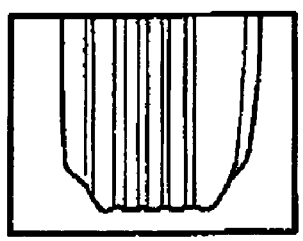
FIG - 5B

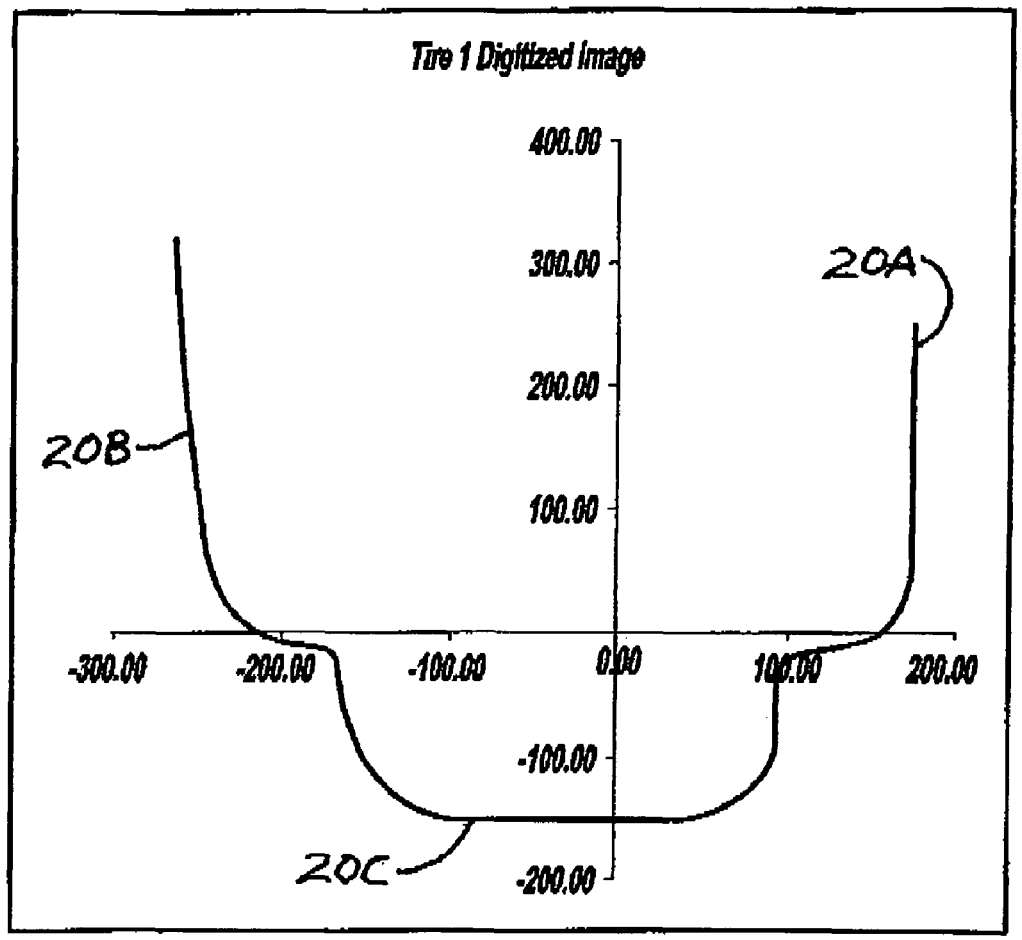
- PDF Results - Tire 2
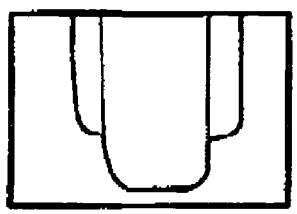
- 2D Image
FIG - 5E

ROBOTIC TIRE SPRAYING SYSTEM

FIELD OF THE INVENTION

This invention relates to a method of and an apparatus for coating green or uncured tires. More particularly, the invention is directed to a system for robotically spraying a coating on predetermined areas both inside and outside green tires.

BACKGROUND OF THE INVENTION

Conventionally, pneumatic rubber tires are produced by molding and curing a green, or uncured, tire in a molding press in which the green tire is pressed outwardly against a mold surface by means of an inner fluid expandable bladder. By this method, the green tire is shaped against the outer mold surface which typically defines the tire's tread pattern and configuration of sidewalls. By application of heat, the tire is cured. Generally, the bladder is expanded by internal pressure provided by a fluid such as hot gas, hot water and/or steam which also participates in the transfer of heat for curing or vulcanization purposes. The tire is then usually allowed to cool somewhat in the mold, sometimes aided by added cold or cooler water to the internal surface of the bladder. Then the mold is opened, the bladder collapsed by removal of its internal fluid pressure and the tire removed from the tire mold. Such tire curing procedure is well known to those having skill in such art.

The use of synthetic rubber compounds in the manufacture of tires makes it necessary to apply suitable coating materials to the rubber surfaces of the fabricated tire carcasses to ensure proper distribution of rubber during the curing operation and the production of finished tires with unblemished surfaces. These coatings are generally liquid in form and are known as lubricants and anti-blemish paints, where the lubricants are applied to the interior surface of a green tire and the anti-blemish paints are applied to the outer surface at the sidewall areas.

The outside green tire paints serve the functions of allowing the rubber to slip as it comes in contact with the metal mold and the paints also serve as a release agent when at the end of the vulcanization cycle, the tire must separate from the mold. Another function of the paint is to provide bleeding of air which becomes trapped between the tire and the mold. Outside green tire paints also aid in the appearance of the finished tire.

Care must be taken that certain areas of the green tire are not coated and that the lubricant employed at the interior of the carcass does not reach any exterior surface of the carcass. Also, applying the coatings manually by either spraying or brushing is time consuming and laborious. Automatic applications, are well known in the art, however, these prior art applications require presorting and separate applicator apparatuses for tire size differences and outer spraying.

U.S. Pat. No. 3,507,247 discloses a coating apparatus including a work-actuated expandable chuck for holding a green tire as the tire is moved through coating and drying zones. The lubricant and paint applying apparatus includes an indexing mechanism for a turret structure which supports identical tire carcass-holding chucks.

The mechanism indexes the carcasses through the spraying and drying steps. Each chuck is manually adaptable to support any size tire carcass. The spray nozzles are manually located relative to the chuck location.

U.S. Pat. No. 5,631,028 discloses a green tire conveyor system for use in a molding machine zone, vulcanizing zone and finishing zone that includes a visual sensor attached to the center of a chuck for locating the center of a green tire via guide marks stamped on the tires. The visual sensor identifies the presence of a green tire and the type of tire. A second distance sensor is attached to a robot for height adjustment of a robot arm corresponding to the type of tire.

U.S. Pat. No. 4,778,060 discloses a tire processing system for sorting tires according to the Department of Transportation's assigned code to each tire manufacturer. The code is optically read by a line-scan camera and sorts green tires using additional information such as: the height of the tire measured from the upper bead, the tire centerline, and other digital optical images transmitted from a camera system located within a painting booth.

Other conventional methods for sorting and spraying the internal and external surfaces of green tires are illustrated in U.S. Pat. Nos. 4,125,639; 5,188,904; and 6,077,469.

While it is known in the art to implement cameras to aid in the locating, conveying and sorting of green tires, it is desirable to provide a vision system that can generate spray positions and fan data based on a two-dimensional image. Further, it is desirable to provide such a system for accurately spraying any size or shaped object with no part specific setup.

SUMMARY OF THE INVENTION

According to the present invention, a robotic spray system is provided for accurately spraying mold release onto any size or shaped green tire. The system analyzes individual green tires using an integrated vision system. The system controls the robotic spray position, the fan, fluid, atomizing air, and tire rotation speed for optimal spray coverage on both the inside and outside of green tires.

In one embodiment, the components of the system include at least one conveyor for transporting a green tire through the vulcanizing process. At least one overhead mounted camera is located over an infeed station. This camera will preferably take a picture of the green tire in the station, estimate the center and radius of the tire and locate the angle of the bar code with respect to the center of the tire. A first robot then uses this angle to rotate or clock the tire to the desired position.

At least a second camera is preferably pointed toward the green tire's tread surface and several feet away from the center of the tire. Lighting is provided and positioned to point towards the tire so that the second camera only sees a shadow of the tire. The second camera checks for a transition from the black shadow of the tire to the white background, defining reference points for the outside tire spraying system.

The advantages of the tire spraying system of the present invention include fully programmable spray and spray positioning for fluid, fan and atomizing, maximizing the efficiency of spray material used and the positioning of the spray. By having a precise spray, overspray is drastically reduced, resulting in a reduction in material costs.

Using vision cameras to dynamically adjust robot spray positions based on varying tire profiles provides the ultimate flexibility to run different tire sizes.

Implementing modern technology with traditional conveying and chucking allows retro-fitting of existing systems with the present invention. Implementing the novel system in an existing or newly constructed system, such as a dual conveyor system, will produce a coated green tire approximately every 7-9 seconds while accurately placing the proper amount of inside and outside tire lube in only the areas specified with minimal overspray. A single conveyor system will deliver a coated green tire approximately every 12-14 seconds.

With this system, the green tires are measured while hanging on a chuck. A tire stretcher pulls the bottom bead out and the vision system takes the image. However, the tire stretcher is optional and the vision system can take the image without pulling the bottom bead out. The system then processes the necessary values fractional seconds before actual spray.

The system verifies through flow metering and pressure sensing that the spray has been dispensed.

The system can be equipped with an HMI (human/machine interface) providing operator fault status and diagnostics. These could include; tire mis-chuck, tire not sprayed, gun plugged, fluid delivery tank level low, limit not made, I/O status, etc.

The robot is the main motion element of the system. Robots are highly reliable and repeatable. The system does not index heavy tires on swing arms using traditional mechanical indexers.

The system according to the present invention is built for the ultimate in flexibility. Calculated robot spray positions are based on individual tire profiles.

Flexible variables include: infeed conveyor speed (VFD), spray fan, fluid, and atomizing air (proportional valves), tire rotation speed and position (servo controlled), exhaust intake (VFD), automatic gun purge, gun fluid/fan test, and chuck cycles (HMI selectable), robot to gun maintenance position, quick change spray guns, etc.

The system is able to handle bead diameters of 13" to 24", Tire Diameter of 20" to 44" and bead to bead height of 10" to 22". Custom engineered systems can be made for larger and/or smaller sizes.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIGS. 1A and 1B illustrate the robotic tire spray application system of the present invention for a single conveyor;

FIG. 2 illustrates the robotic tire spray application system of the present invention for a dual conveyor;

FIGS. 4A-4C illustrate a preferred embodiment of a green tire and method of the present invention; and FIGS. 5A-5F illustrate the analysis of two green tire profiles using the method of the present invention.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

A traditional tire sprayer employs high pressure, high volume guns resulting in overspray, requires a large footprint and has a cycle time of approximately 7-10 sec. These sprayers require large exhaust fans and a different model sprayer for different tire ranges. Further, these sprayers do not typically include a bar code mask, or pressure or flow sensing.

The present invention advantageously combines robotics with a vision system, eliminating the disadvantages of traditional tire sprayers. The robots are preferably provided with an integrated 7th axis control for servo chuck assembly. The system includes a flow meter and pressure sensor, along with vision cameras for reading bar code location and tire profile. A process valve control is included for complete spray control. The ultimate in flexibility is provided with this system where the robots follow tire profile. An overspray catch pan and removable filters are also provided.

Figure 1B:
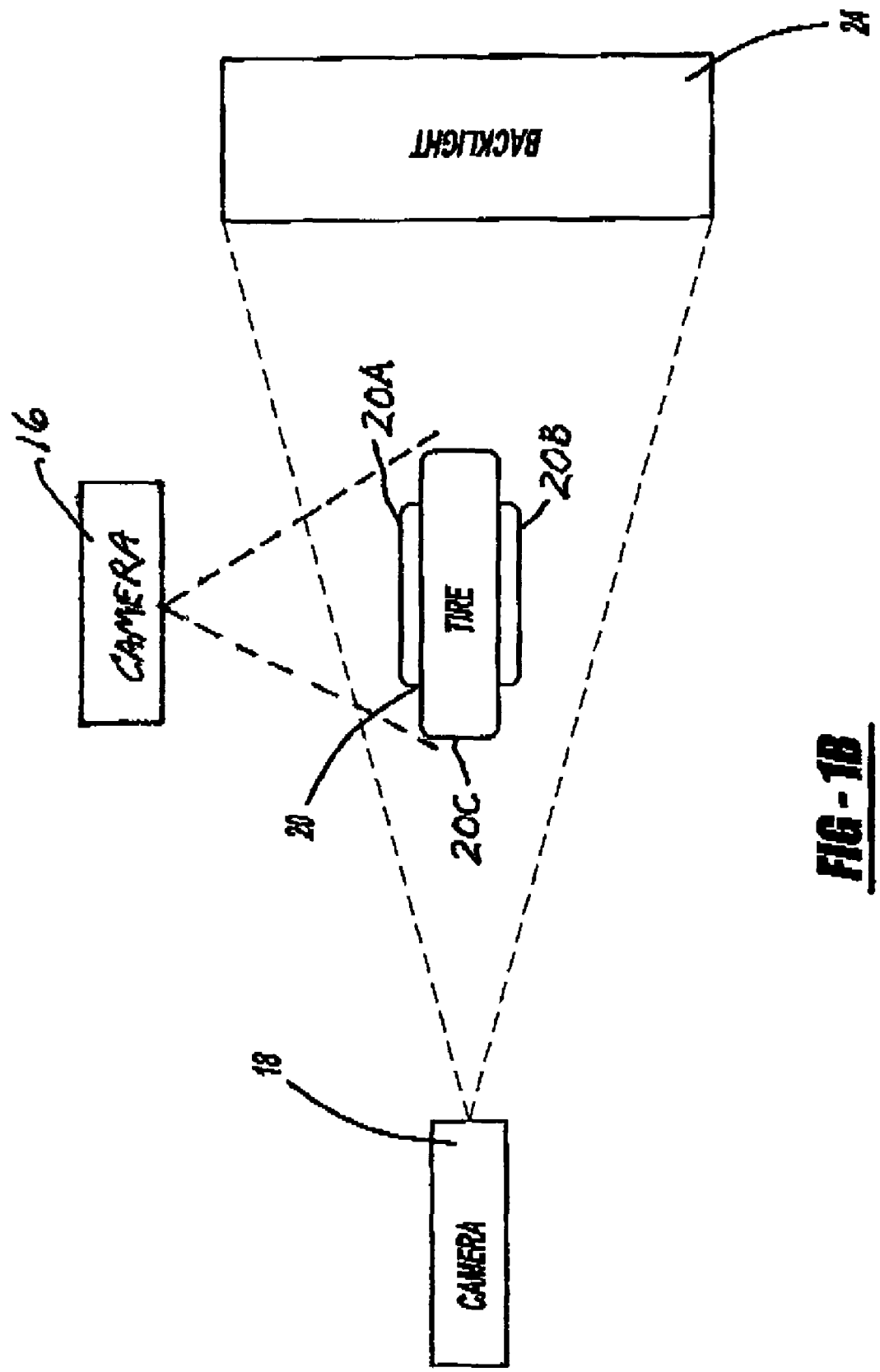

With reference to FIG. 1A, a first preferred embodiment of the green tire painting system 10 of the present invention is there shown and comprises a typical single feed station conveyor 12 and chuck system 14 that is well known in the art. FIG. 2 illustrates a second preferred embodiment of the green tire painting system 100 of the present invention comprising a typical dual feed station conveyor 112 and chuck system 114 that is well known in the art. Generally, both systems 10, 100 include an overhead camera 16, 116 and a camera 18, 118 located to view toward the tread surface of the conveyed green tire 20, 120. Each system 10, 100 also comprises an exhaust fan and stack 22, 122. Lighting and a white backdrop can be used to aid the cameras 18, 118 in imaging each tire profile. A vision system of the present invention preferably includes cameras 16, 116 and 18, 118 used in conjunction with a vision PC and a robot controller. The green tires 20, 120 are positioned on the conveyors 12, 112 with one sidewall facing down and an opposite sidewall facing up. As shown in FIG. 1B, the green tire 20 positioned as shown in FIG. 1A has an upwardly facing first sidewall outer surface 20A a downwardly facing second sidewall outer surface 20B and a tread surface 20C extending in an annular lane connecting the sidewall surfaces.

Figure 3:
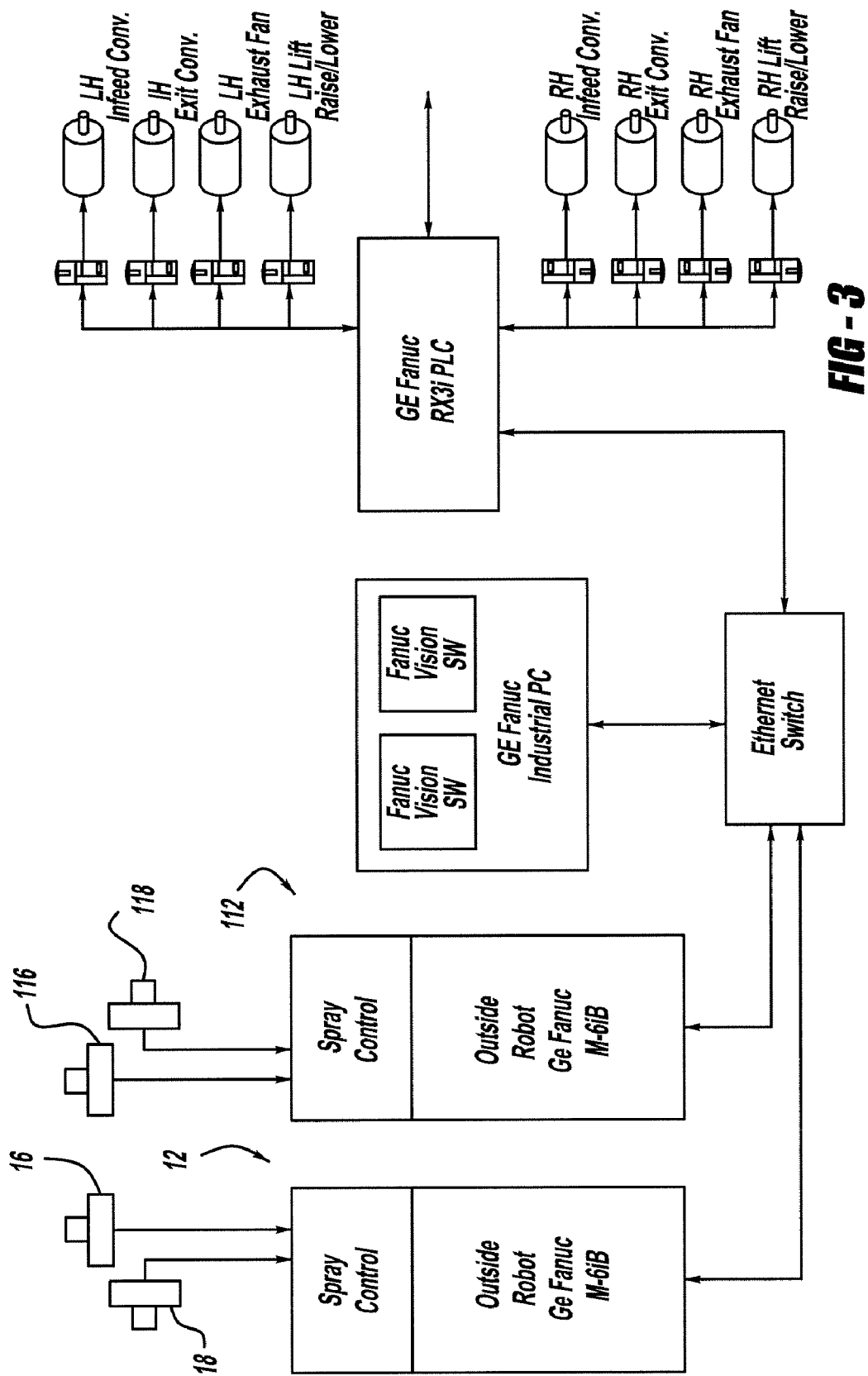
FIG. 3 illustrates a schematic view of the tire spray application system of the present invention.

Generally, the method of the present invention is illustrated in FIGS. 1A, 2 and 3 in use with a typical dual infeed conveyor system and comprises mounting an overhead camera 16, 116 over each feed station 12, 112. The camera 16, 116 takes a picture of the tire 20, 120 and uses this information to estimate the center and radius of the tire 20, 120 along with locating the angle of the bar code (not shown) with respect to the center of the tire 20, 120.

The second camera 18, 118 is preferably located perpendicular to the tire's tread and slightly upstream to clear the stack 22, 122. These cameras 18, 118 are preferably 7' to 12' away from the center line of the tire 20, 120. A white backdrop with lighting 24 (FIG. 1B, where the illustrated set up applies to both the single and dual conveyor system) is positioned just downstream from the robots 26, 126. The lighting 24 is preferably positioned to point towards the tire 20, 120 so that the cameras 18, 118 see only a shadow of the tire 20, 120. The cameras 18, 118 field of view is preferably set up to see one half (½) of the largest tire to be handled.

Figure 4C:
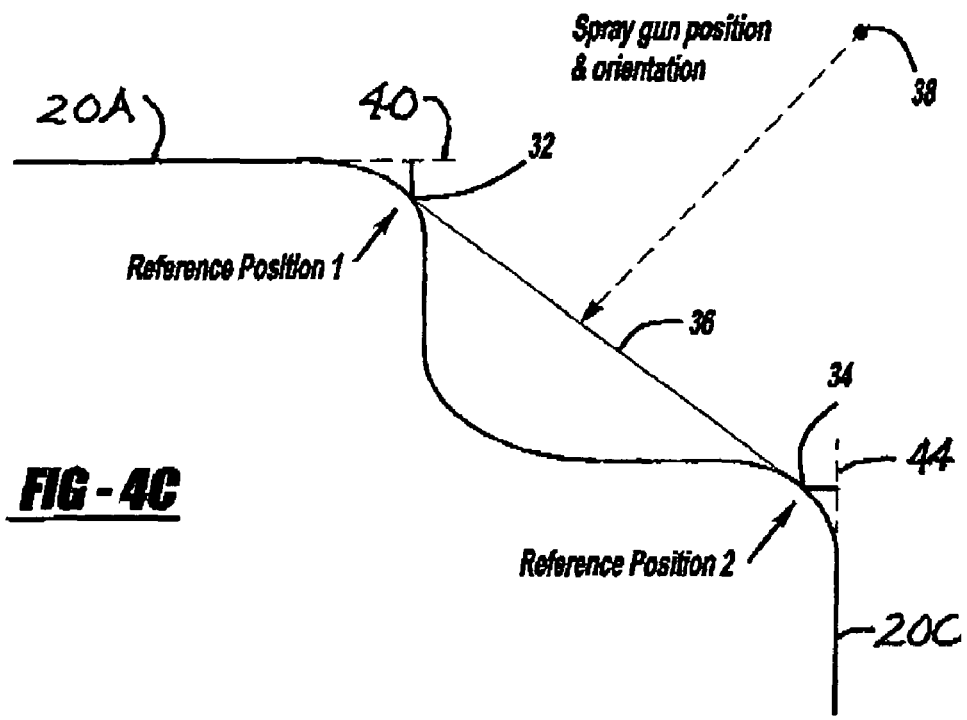

With reference to FIGS. 4A and 4B, the vision process for the pair of cameras 18, 118 is to first fit a line through the top and bottom edge of the tire 20, 120 and outer edge of the tread 28, 128. Based on the location of these lines, the vision system places a series of calipers 30 perpendicular to each line. These calipers 30 start near the center of the tire 20, 120 and gradually move out. Each caliper 30 checks for transition from the black shadow of the tire 20, 120 to the white background as shown. When the vision system determines that this distance is equal to or greater than a predefined distance (approximately ½" to 1"), the vision system saves the x-y reference position coordinates of the transition from white to black. The calipers 30 may be positioned tighter than shown to assure sufficient resolution if necessary. The reference position coordinates 32, 34, a shown in FIG. 4C, are used in conjunction with a computer program, such as the KAREL® program owned by Fanuc Robotics America, Inc. (located in Auburn Hills, Mich.), provided with the robot 26, 126 to determine the center of the line 36 and a position 38 that is a predefined distance away from the center of the line 36. The KAREL® program may also calculate an equivalent point on the inside of the tire 20, 120 using a predefined parameter to set the thickness of the tire. 20, 120.

Testing: Processing and Analysis were performed on two differently configured green tires. These tires were photographed and the PFD was set up to sample every two pixels and collect up to 600 data points. The PFD algorithm was run on both tires. The average processing time per tire was 2.98 seconds. The digitized tire profiles were exported to EXCEL® for plotting and analysis. A PC based software routine was created to perform the following:

1) Start on the top of the left side wall and find the 1st point that varies from calculated slope by a given distance. This is the start of the 1st spray area.

2) Start in the middle of the tread and move to the left finding the 1st point that varies from calculated slope by a given distance. This is the end of the 1st spray area and the beginning of the 2nd.

3) Start in the middle of the tread and move to the right finding the 1st point that varies from calculated slope by a given distance. This is the end of the 2nd spray area and the beginning of the 3rd.

4) Start on the top of the right side wall and find 1st point that varies from calculated slope by a given distance. This is the end of the 3rd spray area.

5) Calculate the length of each spray area (used for fan control) and a point that is perpendicular to the center and offset at the desired spray height.

6) The spray positions are sent to the robot for processing.

Figure 5A:
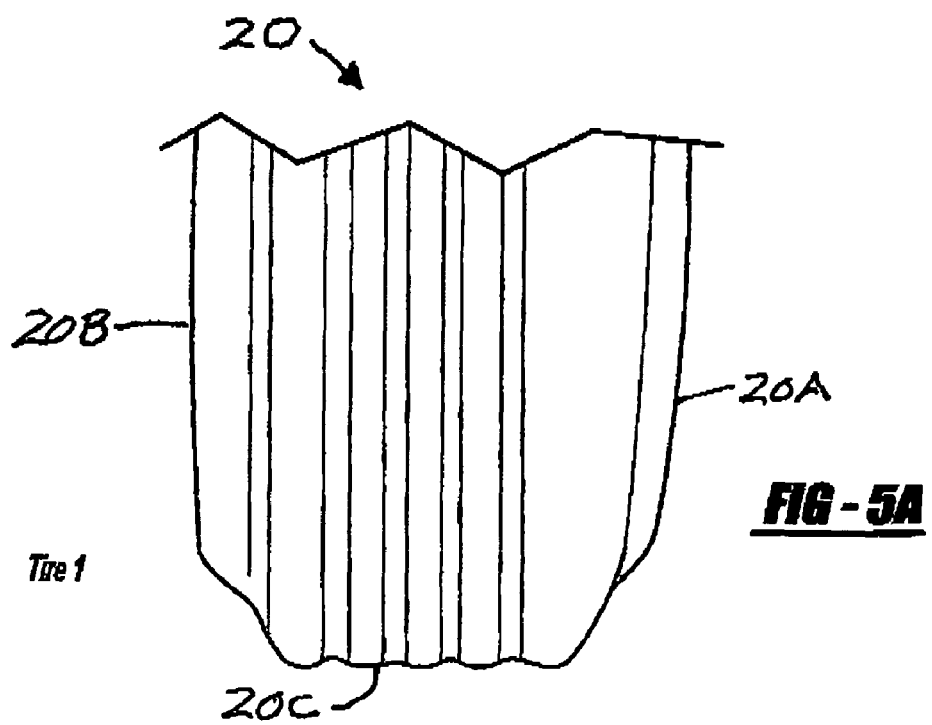
Figure 5C:
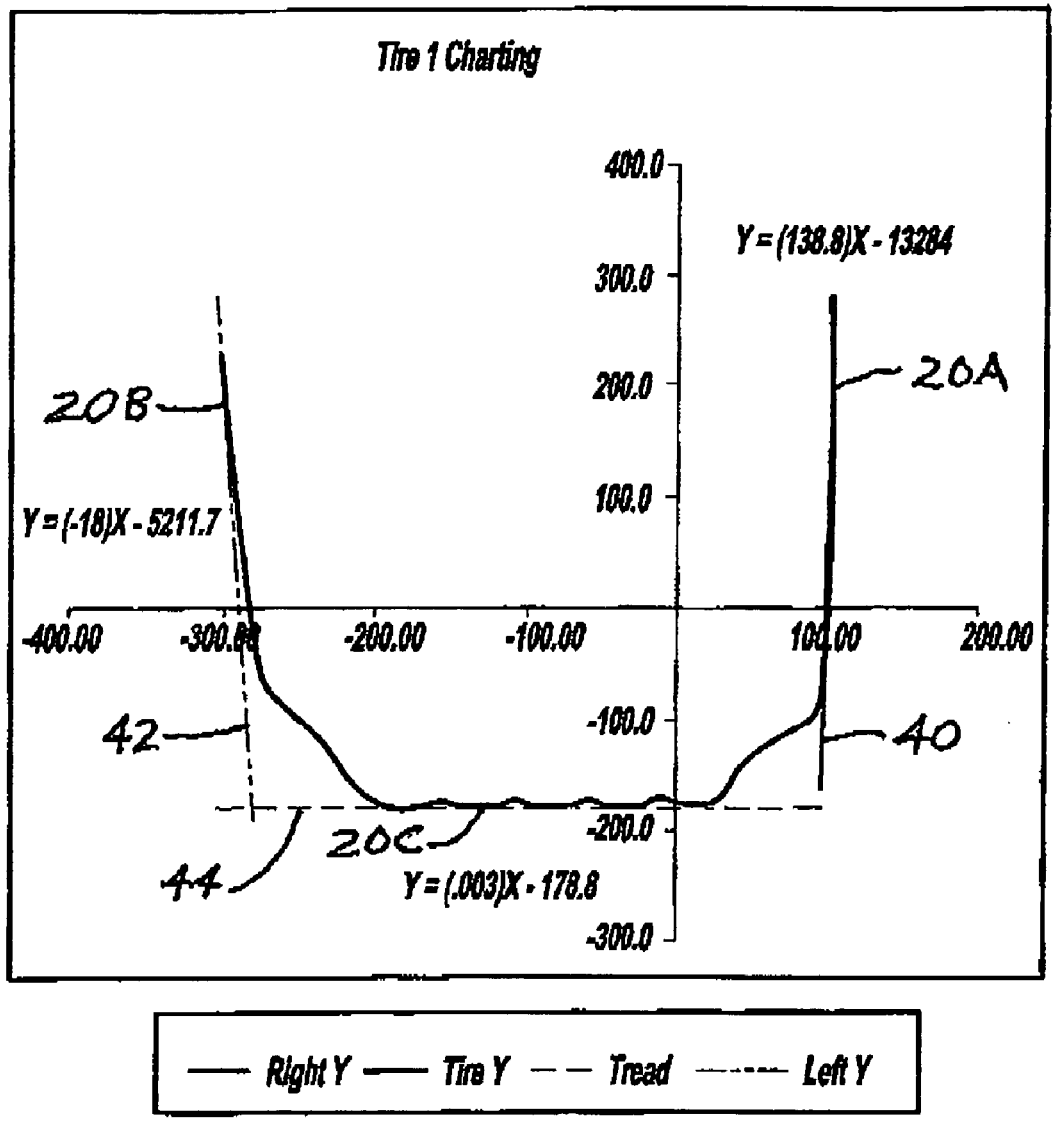

With reference to FIGS. 5A-5C, an analysis was performed initially on a typically configured green tire as is well known in the art as best shown in FIG. 5A. The following measurements and analysis was determined using the vision system described above:

| Data | Calculated | | |
|------|------------|---|---|
| Data | Input | | |

Side Walls

| Right | | Y | X |
|---|---|---|---|
| Right Sidewall Start: | 1 | 270.5 | 97.7 |
| Right Sidewall End: | 81 | 96.6 | 98.9 |
| Right Sidewall Slope: | 138.8 | | |
| B: | -13284.0 | | |

| Left | | Y | X |
|---|---|---|---|
| Left Sidewall Start: | 553 | 289.7 | -305.8 |
| Left Sidewall End: | 473 | 107.7 | -295.6 |
| Left Sidewall Slope: | -18.0 | | |
| B: | -5211.7 | | |

-continued

| Tread | | Y | X |
|---|---|---|---|
| Tread Start Point: | 271 | -178.6 | -73.6 |
| Tread End Point: | 301 | -178.8 | -137.4 |
| Tread Slope: | -0.0003 | | |
| B: | -178.8 | | |

Resulting in the digitized images illustrated in FIGS. 5B and 5C. As described above, the camera 18 is utilized to locate the right sidewall surface 20A or top edge portion of the tire 20 and fit a straight line 40 thereto, the left sidewall surface 20B or bottom edge portion and fit a straight line 42 thereto, and the tread surface portion 20C and fit a straight line 44 thereto. Then the calipers 30 are applied to locate the reference position coordinates 32, 34, the center of the line 36 is determined and the position 38 (FIG. 4C) is calculated.

Figure 5D:
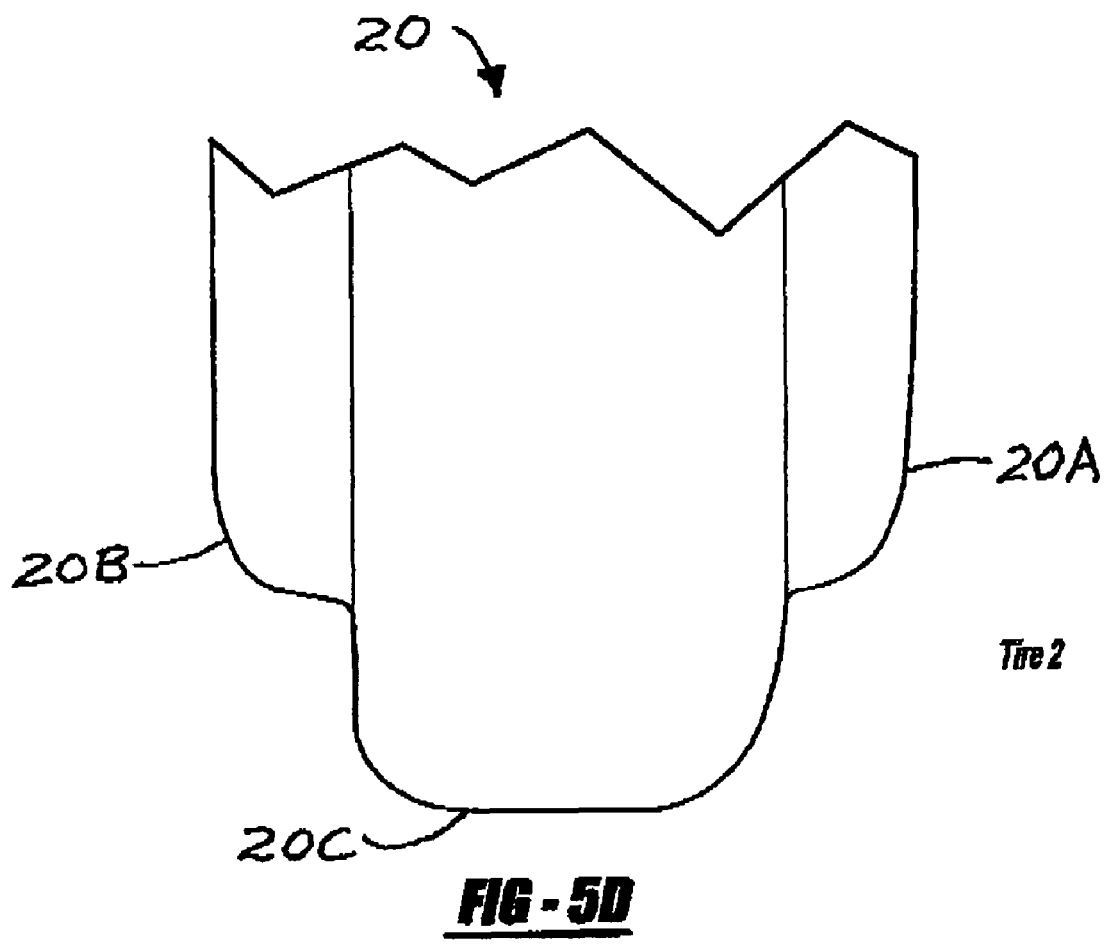
Figure 5F:
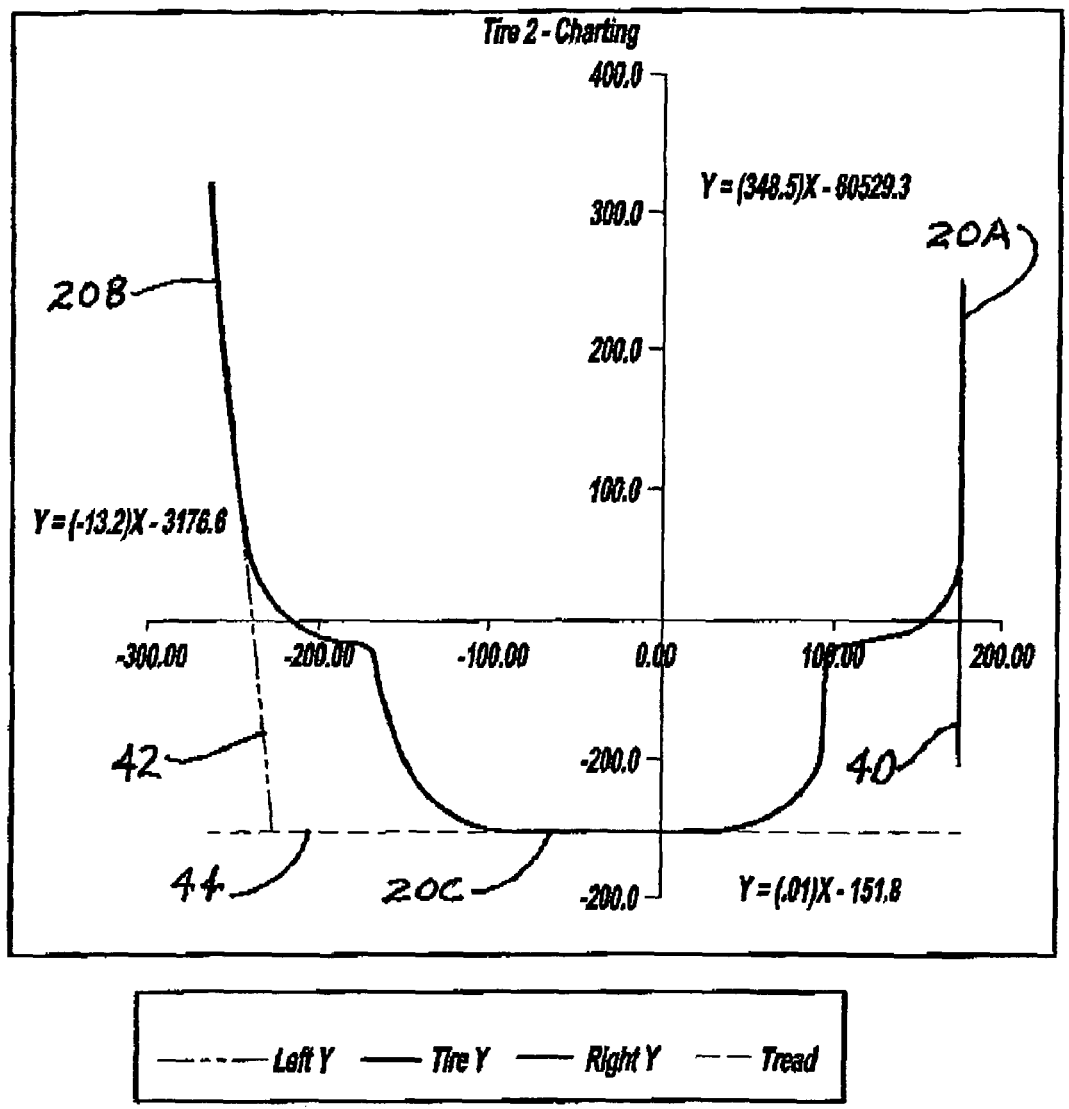

A second green tire configuration illustrated in FIG. 5D was proposed. In this configuration, the bead on both edges is bulged, providing a more pronounced angle between reference points 32, 34. The following measurements and analysis was determined using the vision system described above:

| Data | Calculated |
|------|------------|
| Data | Input |

Tire 2 Data

| Number Data Points: | 533 |
|---|---|

Side Walls

| Adj Side Height | 245.8 | mm |
|---|---|---|
| Slope Offset: | 80 | Points |
| Points to Average: | 10 | Points |

| Tread Walls | | Y | X |
|---|---|---|---|
| Center Tread Point: | 267 | -152.7 | -57.0 |
| Adj Tread Height: | -153.61 | | |
| Slope Offset: | 30 | Points | |
| Points to Average: | 10 | Points | |

Resulting in the digitized images illustrated in FIGS. 5D and 5E. As described above, the camera 18 is utilized to locate the right sidewall surface 20A or top edge portion of the tire 20 and fit the line 40 thereto, the left sidewall surface 20B or bottom edge portion and fit the line 42 thereto, and the tread surface portion 20C and fit the line 44 thereto. Then the calipers 30 are applied to locate the reference position coordinates 32, 34, the center of the line 36 is determined and the position 38 (FIG. 4C) is calculated.

The preferred green tire carcass of the present invention is provided with the pronounced double bead bulge indenting toward the central tread as best shown in FIG. 5D. Thus the reference points illustrated in FIG. 4C are determined for both the upper and lower beads of each green tire carcass.

Using the preferred green tire carcass embodiment and with reference to FIG. 1A, the following sequence of events provide a method for accurately spraying an outer and/or inner coating onto any size or shaped green tire when using a single conveyor tire spraying machine:

| Seq. | Action | Sec. | 1 | 2 | 3 | 4 | 5 | 6 | 7 | 8 | 9 | 10 | 11 | 12 |
|---|---|---|---|---|---|---|---|---|---|---|---|---|---|---|
| 1 | Load/Unload Tire | 2 | ■ | | | | | | | | | | | |
| 2 | Camera #1: Barcode & Tire Top Profile | 1 | | ■ | | | | | | | | | | |
| 3 | Orient Servo Chuck | 1 | | | ■ | | | | | | | | | |
| 4 | Lift Tire | 1 | | | | ■ | | | | | | | | |
| 5 | Chuck Tire | 1 | | | | | ■ | | | | | | | |
| 6 | Lift Down | 1 | | | | | | ■ | | | | | | |
| 7 | Rotate Tire | 1 | | | | | | ■ | ■ | | | | | |
| 8 | Camera#2: Tire Profile | 1 | | | | | | | ■ | | | | | |
| 9 | Catch Pan Extend | 1 | | | | | | | | ■ | | | | |
| 10 | Move Robot Inside Tire #1 | 2 | | | | | | | ■ | ■ | | | | |
| 11 | Spray Inside #1 | 1 | | | | | | | | | ■ | | | |
| 12 | Move Robot Outside Tire #1 top sidewall | 1 | | | | | | | | ■ | | | | |
| 13 | Spray Outside #1 | 1 | | | | | | | | | ■ | | | |
| 14 | Move Robot Inside Tire #2 | 1 | | | | | | | | | ■ | | | |
| 15 | Spray Inside #2 | 1 | | | | | | | | | | ■ | | |
| 16 | Move Robot Outside Tire #2 bot sidewall | 1 | | | | | | | | | ■ | | | |
| 17 | Spray Outside #2 | 1 | | | | | | | | | | ■ | | |
| 18 | Move Outside Robot Clear | 1 | | | | | | | | | | ■ | | |
| 19 | Catch Pan Retract | 1 | | | | | | | | | | | ■ | |
| 20 | Drop Tire | 1 | | | | | | | | | | | | ■ |

The method for accurately spraying an outer coating on a preferred embodiment of a green tire carcass using a dual robot, single conveyor tire spraying machine of the present invention processes each tire in approximately 12 seconds.

Using the preferred green tire carcass embodiment and with reference to FIG. 1B, the following sequence of events extending from a time lapse of one to seven seconds, eight to fourteen seconds, fifteen to twenty-one seconds, and twenty-two to twenty-eight seconds, provides a method for accurately spraying an outer and/or inner coating onto any size or shaped green tire when using a dual conveyor tire spraying machine:

| Sequence | Action | Seconds | 1 | 2 | 3 | 4 | 5 | 6 | 7 |
|---|---|---|---|---|---|---|---|---|---|
| 1 | Load/Unload Tire RH | 3 | | | | | | | |
| 2 | Camera #1 RH: Barcode & Tire Top Profile | 1 | | | | | | | |
| 3 | Orient RH Servo Chuck | 1 | | | | | | | |
| 4 | Lift Tire | 1 | | | | | | | |
| 5 | Chuck Tire | 1 | | | | | | | |
| 6 | Lift Down | 1 | | | | | | | |
| 7 | Rotate Tire | 8 | | | | | | | |
| 8 | Camera #2: Tire Profile | 1 | | | | | | | |
| 9 | Catch Pan Extend | 2 | | | | | | | |
| 10 | Move Robot Inside Tire #1 | 3 | | | | | | | |
| 11 | Spray Inside #1 | 1 | | | | | | | |
| 12 | Move Robot Outside Tire #1 - top sidewall | 1 | | | | | | | |
| 13 | Spray Outside #1 | 1 | | | | | | | |
| 14 | Move Robot Inside Tire #2 | 1 | | | | | | | |
| 15 | Spray Inside #2 | 1 | | | | | | | |
| 16 | Move Robot Outside Tire #2 - bot sidewall | 1 | | | | | | | |
| 17 | Spray Outside #2 | 1 | | | | | | | |
| 18 | Move Outside Robot Clear | 1 | | | | | | | |
| 19 | Drop Tire | 1 | | | | | | | |
| 20 | Load/Unload Tire | 3 | | | | | | | |
| 21 | Camera #1: Barcode & Tire Top Profile | 1 | | | | | | | |
| 22 | Orient Servo Chuck | 1 | | | | | | | |
| 23 | Lift Tire | 1 | | | | | | | |
| 24 | Chuck Tire | 1 | | | | | | | |
| 25 | Lift Down | 1 | | | | | | | |

-continued

| Sequence | Action | Seconds | 1 | 2 | 3 | 4 | 5 | 6 | 7 |
|---|---|---|---|---|---|---|---|---|---|
| 26 | Rotate Tire | 8 | ■ | ■ | ■ | ■ | ■ | ■ | ■ |
| 27 | Camera #2: Tire Profile | 1 | | | | | | | |
| 28 | Catch Pan Extend | 2 | ■ | ■ | | | | | |
| 29 | Move Robot Inside Tire #1 | 3 | | ■ | ■ | ■ | | | |
| 30 | Spray Inside #1 | 1 | | | | ■ | | | |
| 31 | Move Robot Outside Tire #1 - top sidewall | 1 | | | | ■ | ■ | | |
| 32 | Spray Outside #1 | 1 | | | | | ■ | | |
| 33 | Move Robot Inside Tire #2 | 1 | | | | | ■ | ■ | |
| 34 | Spray Inside #2 | 1 | | | | | | ■ | |
| 35 | Move Robot Outside Tire #2 - bot sidewall | 1 | | | | | | ■ | ■ |
| 36 | Spray Outside #2 | 1 | | | | | | | ■ |
| 37 | Move Outside Robot Clear | 1 | | | | | | | ■ |
| 38 | Drop Tire | 1 | | | | | | | |

| Sequence | Action | Seconds | 8 | 9 | 10 | 11 | 12 | 13 | 14 |
|---|---|---|---|---|---|---|---|---|---|
| 1 | Load/Unload Tire RH | 3 | | | | | | | |
| 2 | Camera #1 RH: Barcode & Tire Top Profile | 1 | | | | | | | |
| 3 | Orient RH Servo Chuck | 1 | | | | | | | |
| 4 | Lift Tire | 1 | | | | | | | |
| 5 | Chuck Tire | 1 | | | | | | | |
| 6 | Lift Down | 1 | | | | | | | |
| 7 | Rotate Tire | 8 | ■ | ■ | ■ | ■ | ■ | ■ | ■ |
| 8 | Camera #2: Tire Profile | 1 | | | | | | | |
| 9 | Catch Pan Extend | 2 | ■ | ■ | | | | | |
| 10 | Move Robot Inside Tire #1 | 3 | | ■ | ■ | ■ | | | |
| 11 | Spray Inside #1 | 1 | | | | ■ | | | |
| 12 | Move Robot Outside Tire #1 - top sidewall | 1 | | | | ■ | ■ | | |
| 13 | Spray Outside #1 | 1 | | | | | ■ | | |
| 14 | Move Robot Inside Tire #2 | 1 | | | | | ■ | ■ | |
| 15 | Spray Inside #2 | 1 | | | | | | ■ | |
| 16 | Move Robot Outside Tire #2 - bot Sidewall | 1 | | | | | | ■ | ■ |
| 17 | Spray Outside #2 | 1 | | | | | | | ■ |
| 18 | Move Outside Robot Clear | 1 | | | | | | | ■ |
| 19 | Drop Tire | 1 | | | | | | | ■ |
| 20 | Load/Unload Tire | 3 | ■ | ■ | ■ | | | | |
| 21 | Camera #1: Barcode & Tire Top Profile | 1 | | | ■ | | | | |
| 22 | Orient Servo Chuck | 1 | | | | ■ | | | |
| 23 | Lift Tire | 1 | | | | ■ | | | |
| 24 | Chuck Tire | 1 | | | | | ■ | | |
| 25 | Lift Down | 1 | | | | | | ■ | |
| 26 | Rotate Tire | 8 | | | | | | | ■ |
| 27 | Camera #2: Tire Profile | 1 | | | | | | | |
| 28 | Catch Pan Extend | 2 | | | | | | | |
| 29 | Move Robot Inside Tire #1 | 3 | | | | | | | |
| 30 | Spray Inside #1 | 1 | | | | | | | |
| 31 | Move Robot Outside Tire #1 - top sidewall | 1 | | | | | | | |
| 32 | Spray Outside #1 | 1 | | | | | | | |
| 33 | Move Robot Inside Tire #2 | 1 | | | | | | | |
| 34 | Spray Inside #2 | 1 | | | | | | | |
| 35 | Move Robot Outside Tire #2 - bot sidewall | 1 | | | | | | | |
| 36 | Spray Outside #2 | 1 | | | | | | | |
| 37 | Move Outside Robot Clear | 1 | | | | | | | |
| 38 | Drop Tire | 1 | | | | | | | |

| Sequence | Action | Seconds | 15 | 16 | 17 | 18 | 19 | 20 | 21 |
|---|---|---|---|---|---|---|---|---|---|
| 1 | Load/Unload Tire RH | 3 | ■ | ■ | ■ | | | | |
| 2 | Camera #1 RH: Barcode & Tire Top Profile | 1 | | | ■ | | | | |
| 3 | Orient RH Servo Chuck | 1 | | | | ■ | | | |
| 4 | Lift Tire | 1 | | | | ■ | | | |
| 5 | Chuck Tire | 1 | | | | | ■ | | |
| 6 | Lift Down | 1 | | | | | | ■ | |
| 7 | Rotate Tire | 8 | | | | | | | ■ |
| 8 | Camera #2: Tire Profile | 1 | | | | | | | ■ |
| 9 | Catch Pan Extend | 2 | | | | | | | |
| 10 | Move Robot Inside Tire #1 | 3 | | | | | | | |
| 11 | Spray Inside #1 | 1 | | | | | | | |
| 12 | Move Robot Outside Tire #1 - top sidewall | 1 | | | | | | | |

-continued

| | | | |
|---|---|---|---|
| 13 | Spray Outside #1 | 1 | |
| 14 | Move Robot Inside Tire #2 | 1 | |
| 15 | Spray Inside #2 | 1 | |
| 16 | Move Robot Outside Tire #2 - bot Sidewall | 1 | |
| 17 | Spray Outside #2 | 1 | |
| 18 | Move Outside Robot Clear | 1 | |
| 19 | Drop Tire | 1 | |
| 20 | Load/Unload Tire | 3 | |
| 21 | Camera #1: Barcode & Tire Top Profile | 1 | |
| 22 | Orient Servo Chuck | 1 | |
| 23 | Lift Tire | 1 | |
| 24 | Chuck Tire | 1 | |
| 25 | Lift Down | 1 | |
| 26 | Rotate Tire | 8 | |
| 27 | Camera #2: Tire Profile | 1 | |
| 28 | Catch Pan Extend | 2 | |
| 29 | Move Robot Inside Tire #1 | 3 | |
| 30 | Spray Inside #1 | 1 | |
| 31 | Move Robot Outside Tire #1 - top sidewall | 1 | |
| 32 | Spray Outside #1 | 1 | |
| 33 | Move Robot Inside Tire #2 | 1 | |
| 34 | Spray Inside #2 | 1 | |
| 35 | Move Robot Outside Tire #2 - bot sidewall | 1 | |
| 36 | Spray Outside #2 | 1 | |
| 37 | Move Outside Robot Clear | 1 | |
| 38 | Drop Tire | 1 | |

| Sequence | Action | Seconds | 22 | 23 | 24 | 25 | 26 | 27 | 28 |
|---|---|---|---|---|---|---|---|---|---|
| 1 | Load/Unload Tire RH | 3 | | | | | | | |
| 2 | Camera #1 RH: Barcode & Tire Top Profile | 1 | | | | | | | |
| 3 | Orient RH Servo Chuck | 1 | | | | | | | |
| 4 | Lift Tire | 1 | | | | | | | |
| 5 | Chuck Tire | 1 | | | | | | | |
| 6 | Lift Down | 1 | | | | | | | |
| 7 | Rotate Tire | 8 | | | | | | | |
| 8 | Camera #2: Tire Profile | 1 | | | | | | | |
| 9 | Catch Pan Extend | 2 | | | | | | | |
| 10 | Move Robot Inside Tire #1 | 3 | | | | | | | |
| 11 | Spray Inside #1 | 1 | | | | | | | |
| 12 | Move Robot Outside Tire #1 - top sidewall | 1 | | | | | | | |
| 13 | Spray Outside #1 | 1 | | | | | | | |
| 14 | Move Robot Inside Tire #2 | 1 | | | | | | | |
| 15 | Spray Inside #2 | 1 | | | | | | | |
| 16 | Move Robot Outside Tire #2 - bot Sidewall | 1 | | | | | | | |
| 17 | Spray Outside #2 | 1 | | | | | | | |
| 18 | Move Outside Robot Clear | 1 | | | | | | | |
| 19 | Drop Tire | 1 | | | | | | | |
| 20 | Load/Unload Tire | 3 | | | | | | | |
| 21 | Camera #1: Barcode & Tire Top Profile | 1 | | | | | | | |
| 22 | Orient Servo Chuck | 1 | | | | | | | |
| 23 | Lift Tire | 1 | | | | | | | |
| 24 | Chuck Tire | 1 | | | | | | | |
| 25 | Lift Down | 1 | | | | | | | |
| 26 | Rotate Tire | 8 | | | | | | | |
| 27 | Camera #2: Tire Profile | 1 | | | | | | | |
| 28 | Catch Pan Extend | 2 | | | | | | | |
| 29 | Move Robot Inside Tire #1 | 3 | | | | | | | |
| 30 | Spray Inside #1 | 1 | | | | | | | |
| 31 | Move Robot Outside Tire #1 - top sidewall | 1 | | | | | | | |
| 32 | Spray Outside #1 | 1 | | | | | | | |
| 33 | Move Robot Inside Tire #2 | 1 | | | | | | | |
| 34 | Spray Inside #2 | 1 | | | | | | | |
| 35 | Move Robot Outside Tire #2 - bot sidewall | 1 | | | | | | | |
| 36 | Spray Outside #2 | 1 | | | | | | | |
| 37 | Move Outside Robot Clear | 1 | | | | | | | |
| 38 | Drop Tire | 1 | | | | | | | |

The method for accurately spraying an outer and/or inner coating on a preferred embodiment of a green tire carcass using a dual robot, dual conveyor tire spraying machine of the present invention processes each tire in approximately 7 seconds.

As is illustrated above, once the reference points 32, 34 are determined, the outer spray is directed to the area between these points by robots 26. This method prevents overspray, minimizes material waste and provides for spraying any size green tire carcass.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for spraying a coating fluid on a surface of a green tire comprising the steps of:
   a) providing a green tire on a chuck, the green tire having a sidewall outer surface extending between a bead and a tread surface;
   b) providing a camera viewing the green tire on the chuck and generating from the camera an image of the green tire in profile including the tread surface and the sidewall outer surface;
   c) fitting a first line along a first portion of the image representing the sidewall outer surface and fitting a second line along a second portion of the image representing the tread surface;
   d) applying calipers to the image to determine a first reference point on the green tire where the sidewall outer surface deviates from the first line and is located a first predetermined distance from the first line and a second reference point on the green tire where the tread surface deviates from the second line and is located a second predetermined distance from the second line; and
   e) spraying a coating fluid on the sidewall outer surface in a circumferential area bounded by the first and second reference points, said area being less than an entire area of the sidewall outer surface.

2. The method according to claim 1 further comprising performing said steps b) through e) for a second sidewall outer surface of the green tire.

3. The method according to claim 2 further comprising spraying the coating fluid on the tread surface in a annular area bounded by the second reference point and a third reference point where the tread surface is located a third predetermined distance from the second line.

4. The method according to claim 1 further comprising providing another camera viewing the green tire on the chuck, generating an image of the sidewall outer surface from the another camera, and determining a position of the green tire on the chuck.

5. The method according to claim 4 further comprising estimating a center and a radius of the green tire and locating an angle of a bar code on the green tire with respect to the center.

6. The method according to claim 1 further comprising determining a center point of a line extending between the first and second reference points and positioning a spraying robot a predetermined distance from the center point to perform said step e), wherein the spraying robot position is spaced apart from the tire and the predetermined distance is defined prior to the step of determining the center point of the line.

7. The method according to claim 6 further comprising positioning the spraying robot inside the green tire for spraying a sidewall inner surface based upon the center point and a thickness of the green tire between the sidewall inner and outer surfaces.

8. The method according to claim 1 wherein the bead bulges from the sidewall outer surface and the first reference point is located at the bulge of the bead.

9. A method for spraying a coating fluid on a surface of a green tire comprising the steps of:
   a) providing a green tire on a chuck, the green tire having a first sidewall outer surface extending between a first bead and a tread surface and a second sidewall outer surface extending between a second bead and the tread surface;
   b) providing a camera viewing the green tire on the chuck and generating from the camera an image of the green tire in profile including the tread surface and the first and second sidewall outer surfaces;
   c) fitting a first line along a first portion of the image representing the first sidewall outer surface, fitting a second line along a second portion of the image representing the tread surface and fitting a third line along a third portion of the image representing the second sidewall outer surface;
   d) applying calipers to the image to determine a first reference point on the green tire where the first sidewall outer surface deviates from the first line and is located a first predetermined distance from the first line, a second reference point on the green tire where the tread surface deviates from the second line and is located a second predetermined distance from the second line adjacent the first sidewall outer surface, a third reference point on the green tire where the tread surface deviates from the second line and is located a third predetermined distance from the second line adjacent the second sidewall outer surface, and a fourth reference point on the green tire where the second sidewall outer surface deviates from the third line and is located a fourth predetermined distance from the third line;
   e) spraying a coating fluid on the first sidewall outer surface in a circumferential first area bounded by the first and second reference points, said first area being less than an entire area of the first sidewall outer surface;
   f) spraying the coating fluid on the second sidewall outer surface in a circumferential second area bounded by the third and fourth reference points, said second area being less than an entire area of the second sidewall outer surface; and
   g) spraying the coating fluid on the tread surface in an annular area bounded by the second and third reference points.

10. The method according to claim 9 further comprising providing another camera viewing the green tire on the chuck, generating an image of the first sidewall outer surface from the another camera, and determining a position of the green tire on the chuck.

11. The method according to claim 10 further comprising estimating a center and a radius of the green tire and locating an angle of a bar code on the green tire with respect to the center.

12. The method according to claim 9 further comprising determining a center point of a line extending between the first and second reference points and positioning a spraying robot a predetermined distance from the center point to perform said step e), wherein the spraying robot position is spaced apart from the tire and the predetermined distance is defined prior to the step of determining the center point of the line.

13. The method according to claim 12 further comprising positioning the spraying robot inside the green tire for spraying a sidewall inner surface based upon the center point and a thickness of the green tire between the sidewall inner surface and the first sidewall outer surface.

14. The method according to claim 9 further comprising determining a center point of a line extending between the third and fourth reference points and positioning a spraying robot a predetermined distance from the center point to perform said step f), wherein the spraying robot position is spaced apart from the tire and the predetermined distance is defined prior to the step of determining the center point of the line.

15. The method according to claim 14 further comprising positioning the spraying robot inside the green tire for spraying a sidewall inner surface based upon the center point and a thickness of the green tire between the sidewall inner surface and the second sidewall outer surface.

16. The method according to claim 9 wherein the first bead bulges from the first sidewall outer surface and the first reference point is located at the bulge of the first bead.

17. The method according to claim 9 wherein the second bead bulges from the second sidewall outer surface and the fourth reference point is located at the bulge of the second bead.

18. A method for spraying a coating fluid on a surface of a green tire comprising the steps of:
   a) providing a green tire on a chuck, the green tire having a first sidewall outer surface extending between a first bead and a tread surface and a second sidewall outer surface extending between a second bead and the tread surface;
   b) providing a camera viewing the green tire on the chuck and generating from the camera an image of the green tire in profile including the tread surface and the first and second sidewall outer surfaces;
   c) fitting a first line along a first portion of the image representing the first sidewall outer surface, fitting a second line along a second portion of the image representing the tread surface and fitting a third line along a third portion of the image representing the second sidewall outer surface;
   d) applying calipers to the image to determine a first reference point on the green tire where the first sidewall outer surface deviates from the first line and is located a first predetermined distance from the first line, a second reference point on the green tire where the tread surface deviates from the second line and is located a second predetermined distance from the second line adjacent the first sidewall outer surface, a third reference point on the green tire where the tread surface deviates from the second line and is located a third predetermined distance from the second line adjacent the second sidewall outer surface, and a fourth reference point on the green tire where the second sidewall outer surface deviates from the third line and is located a fourth predetermined distance from the third line;
   e) spraying a coating fluid from a robot on the first sidewall outer surface in a circumferential first area bounded by the first and second reference points, said first area being less than an entire area of the first sidewall outer surface;
   f) spraying the coating fluid from the robot on the second sidewall outer surface in a circumferential second area bounded by the third and fourth reference points, said second area being less than an entire area of the second sidewall outer surface; and
   g) spraying the coating fluid from the robot on the tread surface in an annular area bounded by the second and third reference points.

* * * * *